Dec. 2, 1952 — F. A. LOWER — 2,619,994
VEHICLE MOUNTED ENDLESS CUTTER FOR TREE FELLING
Filed Dec. 1, 1947 — 3 Sheets-Sheet 1
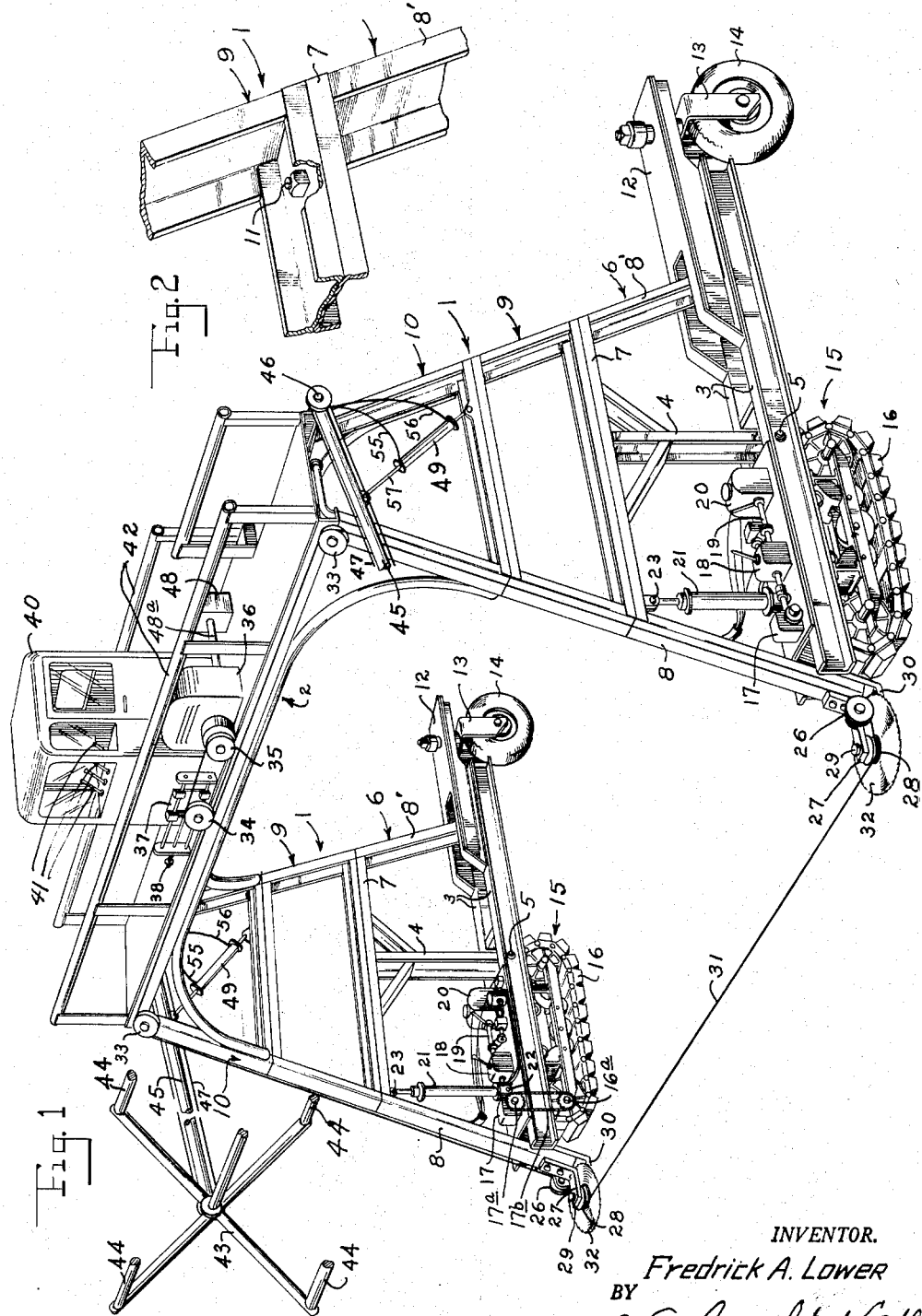
INVENTOR.
Fredrick A. Lower
BY
Wayland D. Keith
HIS AGENT Dec. 2, 1952   F. A. LOWER   2,619,994
VEHICLE MOUNTED ENDLESS CUTTER FOR TREE FELLING
Filed Dec. 1, 1947   3 Sheets-Sheet 2
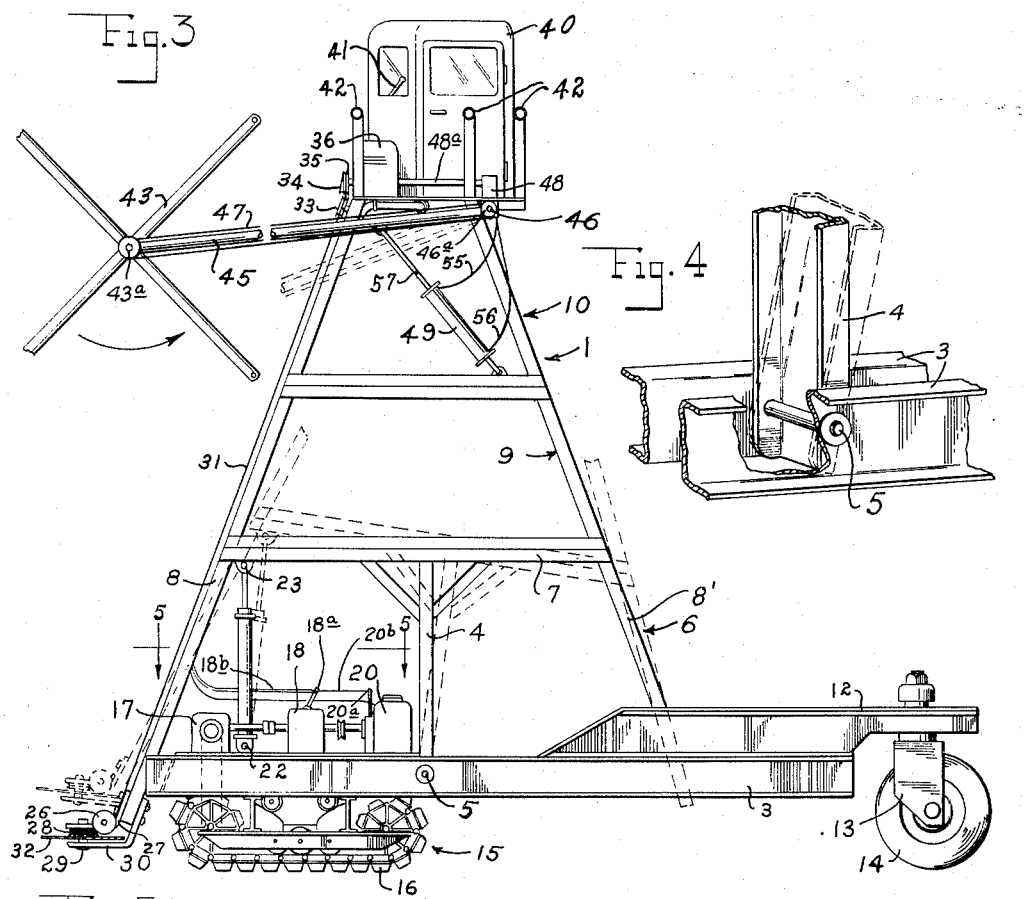
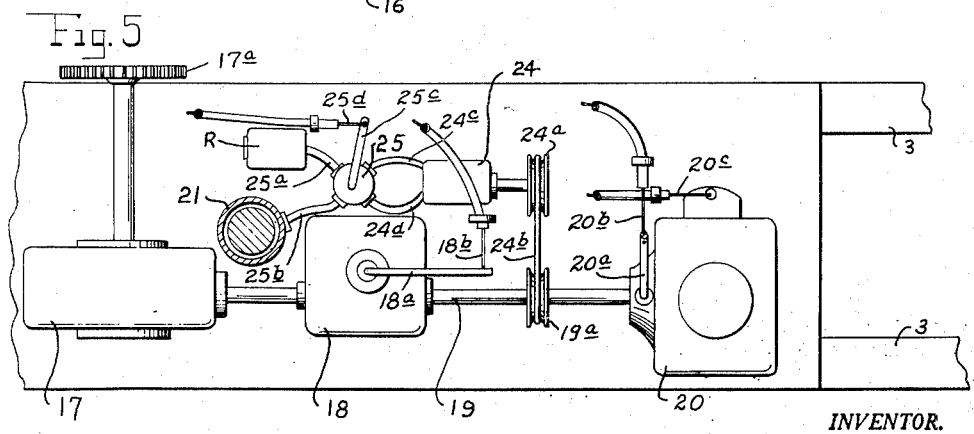
INVENTOR.
Fredrick A. Lower
BY
Wayland D. Keith
HIS AGENT

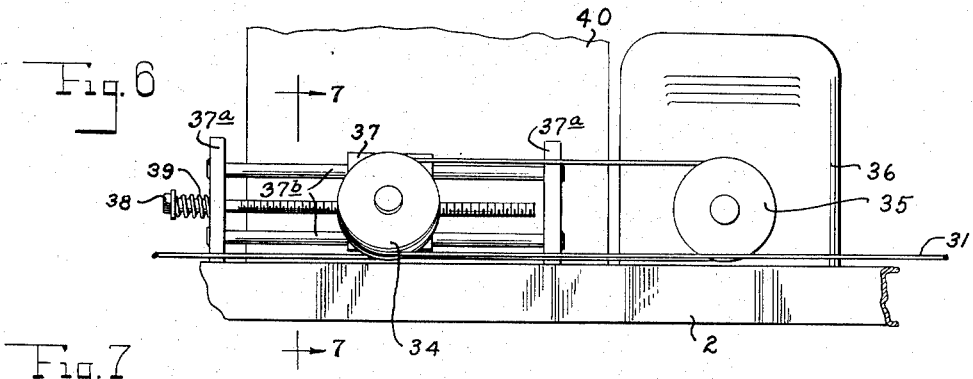
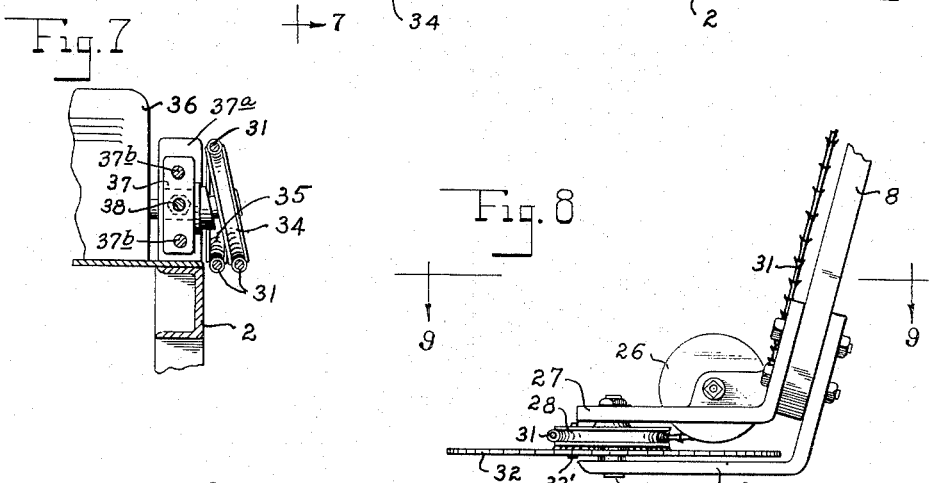
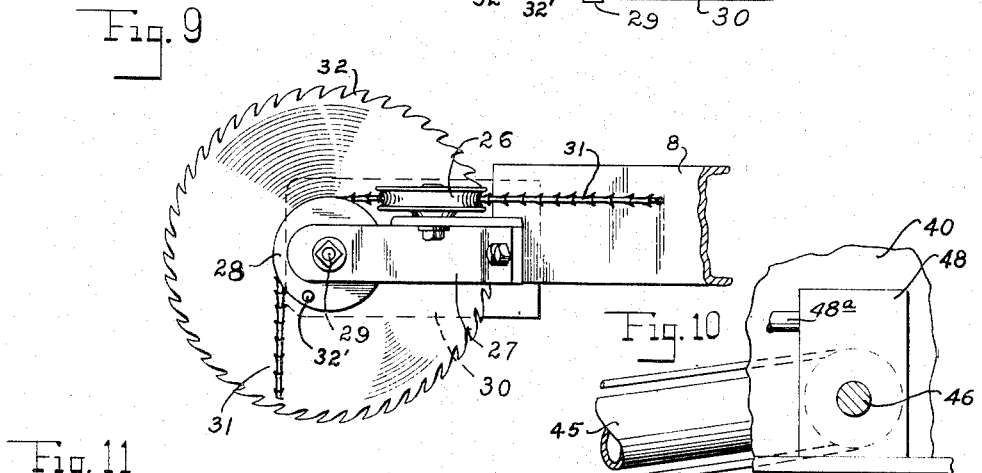
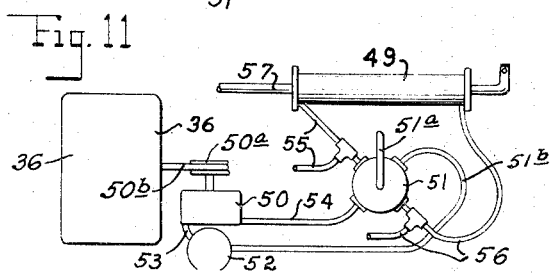

Patented Dec. 2, 1952

2,619,994

UNITED STATES PATENT OFFICE 2,619,994

VEHICLE MOUNTED ENDLESS CUTTER FOR TREE FELLING

Fredrick A. Lower, Wichita Falls, Tex.

Application December 1, 1947, Serial No. 789,020

18 Claims. (Cl. 143—32)

This invention relates to improvements in vehicle mounted endless cutter for tree felling adapted particularly for clearing land of brush, trees, and other plant growths thereon.

In my prior application for Machines for Clearing Undergrowth from Land, Serial No. 730,739, filed February 25, 1947, I have set forth the construction of a machine adapted to cut brush, trees, and other growing objects during the clearing of land, but I have found from actual experience that this machine had limitations in its use and applicability.

One object of this invention is to improve the construction of machines for this purpose, to insure of the cutting of trees, shrubs and underbrush during the clearing of land, and the passage of the machine over such growth following the cutting operation, without entanglement of the cut objects with the operation of the machine.

A furher object of the invention is to so construct the machine that it will clear upstanding trees, shrubs and underbrush during the passage thereover in the clearing of the land, so as to accomplish an effective cutting action and an effective deflection of the cut objects without entanglement or interference with the operation of the machine.

These objects may be accomplished, according to one embodiment of the invention, by the construction of upstanding side frames connected together at the top by a frame which will serve not only as an effective connection rigidly holding the side frames in place, but also as a mounting for the source of power that operates the cutters and other operating parts of the machine. It is preferred to use an endles flexible cutter that extends laterally in bridging relation between the upstanding side frames and is power driven, which cutter has been found very effective in service.

This embodiment of the invention is illustrated in the accompanying drawings in which:

Fig. 1 is a perspective view of the machine;

Fig. 2 is an enlarged fragmentary perspective view, with parts broken away and shown in section, showing the manner of joining the sections of frame members together.

Fig. 3 is an end elevation of the mahine;

Fig. 4 is an enlarged fragmentary view, with parts broken away and shown in section to illustrate the details of construction of the hinge joint between the sills and the upright frame members.

Fig. 5 is a top plan view of the power unit for one side of the machine taken substantially on the line 5—5 in Fig. 3;

Fig. 6 is a side elevation of the flexible cutter drive unit;

Fig. 7 is a cross section therethrough on the line 7—7 in Fig. 6;

Fig. 8 is an enlarged fragmentary side elevational view of the lower portion of a side frame showing the cutter guides and cutter mountings;

Fig. 9 is a horizontal section therethrough on the line 9—9 in Fig. 8;

Fig. 10 is an end view of a portion of the main drive for the reel; and

Fig. 11 is a diagrammatic view of the hydraulic system for controlling the height of the reel.

The invention is shown as applied to a machine for cutting and removing trees, shrubbery and brush during the clearing of land. It may be desired to remove trees of substantial height, and without interference thereby with the cutting operation, as is made possible in this embodiment of the invention.

In this form, the machine is shown as constructed of a pair of upright side frames 1, connected together at the top by a cross frame generally designated at 2. This provides an upright yoke capable of straddling the underbrush, trees, etc., and the cutting operation may take place at the bottom thereof, so that the trees and brush will clear the machine and allow the latter to pass thereover during and subsequent to the cutting operation. The space between the supporting side frames 1 is free and clear, except for the cutter.

Each of the upright supporting side frames 1 is shown constructed with a pair of sills 3, spaced apart to receive an upright post 4 therebetween which is pivoted to the sills 3 at 5, as shown in Figs. 1 and 4, capable of swinging relative thereto. The post 4 carries on the upper end thereof, a lower frame section generally designated at 6, including a cross bar 7, and converging sides 8 and 8', which frame is rigid and secured rigidly to the post 4. The sides 8 and 8' extend downward between the sills 3, but are free thereof, capable of swinging movement with respect to the sills.

An intermediate section 9 is mounted upon the cross member 7, and is also constructed preferably of channel bars or of other suitable material which is capable for use for this purpose. A top section 10 is secured upon the intermediate section 9, and this top section 10 supports one end of the cross bar 2.

The sections 6, 9 and 10 are detachably secured together as by bolts or other detachable fastenings, as indicated generally at 11, in Fig. 2, whereby the sections may be disassembled when desired, or the intermediate section 9 may be omitted entirely or replaced by a higher section, and, if omitted, the top section 10 may be mounted directly on the cross member 7 of the lower section when such increased height is not required.

The spaced sills 3 are secured together at the back ends thereof, by a bearing block 12 within which is journaled a yoke 13. A wheel 14 is journaled in the yoke 13, and supports the back end of the frame structure.

The front end of the frame structure is supported upon a power unit generally designated at 15, including an endless track device 16, of a character well-known in the art of vehicles. Any suitable traction unit may be used as desired, but in the form illustrated, the endless track device 16, is shown as driven from a speed reducing gearing 17 (see Fig. 5) through sprockets 16a and 17a positioned respectively on the shafts of the endless track device and the speed reducing gear unit. These sprockets are interconnected by chain 17b which will be controlled by a transmission 18 connected with a drive shaft 19 from a power plant, such as an internal combustion engine 20. The transmission 18 is provided with a lever 18a to which is connected a push and pull wire 18b leading to one of the control levers 41. Engine 20 has an upstanding control lever 20a for normally controlling a clutch and is operable by a push and pull wire 20b which leads to a control lever in the operator's cab 40. A control wire 20c also leads to engine 20 so as to control the fuel supply on the line of engine 20. A similar unit is provided at each end of the frame, and steering may be accomplished in a manner well understood in the use of such endless track devices, as by varying the speeds of the respective track devices or even reversing one with respect to the other as may be controlled by the engines 20 and transmissions 18.

Also connected with the traction unit 16, is a hydraulic power device 21, comprising the usual cylinder with a piston therein adapted to be moved up in the cylinder by the forcing of fluid under pressure in the lower end of the cylinder against the piston. The weight of the frame will force the piston down by release of pressure. The hydraulic power device 21 is shown as pivotally connected at 22 to the traction unit 15 and pivotally connected at 23 to the cross bar 7 of the lower frame section, capable of acting on the latter to swing the end frame about the pivot 5. The shaft 19 carries a pulley 19a over which a belt 24b passes for the driving of pulley 24a to actuate the hydraulic pump 24 by the power of engine 20. The hydraulic power device 21 may be controlled in the usual manner, as by a hydraulic pump 24 (Fig. 5), operated from the drive shaft 19, and by a control valve 25, such as a fourway valve, which controls the supply of fluid under pressure into the cylinder of the hydraulic power device. The hydraulic pump 24 has a conduit line 24c connected through 4-way valve 25 for interconnection as desired, with conduit 25a leading to reservoir R, or an alternate connection with conduit 24d when the valve 25 is in another position.

With the valve 25 in one position, the hydraulic fluid is withdrawn from reservoir R through conduit 25a through 4-way valve 25 through conduit 24c into pump 24 and discharging into conduit 25b and thence into cylinder 21 so as to lift the forward side of the end frame. The 4-way valve 25 is remotely controlled by push and pull wire 25d being connected to lever 25c and to one of the control levers 41 in the operating cab 40.

The lower end of each frame member 8 is shown having a guide sheave 26, journaled in a bracket 27, secured to the frame member 8 and arranged to provide substantially a vertical guiding action. Also secured to the bracket 27 is a guide sheave 28, mounted on a journal 29 which extends downwardly from the bracket 27, and has its lower end connected with a runner 30, that is attached to the lower end of the frame member 8, as shown in Figs. 8 and 9. The guide sheaves 26 and 28 are adapted to receive an endless flexible cutter 31, which extends therebout and in bridging relation between the sheaves 28 at the opposite ends of the machine, as shown in Fig. 1, adjacent the ground level on which the machine travels. A circular saw is shown also at 32, fixed to each of the sheaves 28, or to turn therewith and be operated by the endless flexible cutter 31, to cause the cutting of any objects in a path sufficiently wide to receive the traction device 15, a portion of which would be outside of the path of cutting movement of the cutter 31.

The endless flexible cutter 31 may be constructed in any suitable manner satisfactory for the purpose, one form of which is shown in my prior application, Serial No. 730,739, filed February 25, 1947, and other forms are shown in my prior application for Portable Power Saws, Serial No. 787,048, filed November 20, 1947. This saw extends vertically angularly upward along the front side of each end frame 6, 9, and 10, to guide sheaves 33 at the opposite ends of the connecting top frame 2, thence over guide sheaves 34 and 35, shown in Figs. 6 and 7, the latter of which is power driven as by an engine 36. A pair of upright supports 37a are positioned a spaced distance apart on top member 2 for supporting parallel bars 37b upon which slide block 37 is slidably supported. As shown in Fig. 7, the sheaves 34 are tilted with respect to the sheave 35 to permit the flexible cutter to pass in a loop therearound for adjustment and tightening purposes, without interference by the loop with a side run of the cutter. The guide sheave 34 is journaled on a block 37, capable of sliding adjustment on parallel bars 37b by a rod 38 under the influence of a spring 39 or a weight attached to the rod 38. This spring may be adjusted in tension by a screw adjustment of the rod 38, and will act to maintain yielding pressure on the sheave 34 in an outward direction with respect to the loop in the cutter 31, as will be evident from Fig. 6.

The engine 36 that operates the cutter is shown as mounted on the connecting top frame 2, adjacent or within a cab generally indicated at 40 to accommodate the operator of the machine. Suitable controls are shown at 41, in the cab 40, to control the various operating parts and engines of the machine, as by push and pull control wires extending to the control elements of the engines 20 and 36, valves 25, etc., for synchronizing and controlling the operation of the machine, which elements may be controlled individually or synchronized for joint control as desired. An enclosed cab is not required but is practical for use, and railings are also shown at 42, along the top of the connecting top frame 2, to accommodate workmen in the use of the machine.

It may be desirable also to provide a reel to insure of deflection of tall shrubbery and brush, and to cause these to be turned downward to prone positions, as the machine passes thereover. Such a reel is shown in Figs. 1 and 3, and may be used, if desired. In this form, the reel is shown as constructed of a pair of spaced spiders 43, at opposite sides of the machine and connected together by tie rods 44 carried at the peripheries of the spiders. The spiders 43 are supported on arms 45, which extend forwardly of the frame on the outer sides of the upright end frames and are mounted for swinging movement about the axis of a shaft 46 journaled on the connecting top frame 2. The shaft 46 is connected through suitable gearing, such as V-belts 47, which extend between V-belt pulleys 46a and 43a and the drive shaft and reel, respectively, which will cause the reel with the spiders 43 to rotate these in unison upon operation of the shaft. The shaft 46 is shown as driven by gearing generally indicated at 48 in Fig. 10, from the engine 36. A shaft 48a extends between engine 36 and gearing 48 for the driving of gear unit 48.

The height of the reel may be adjusted vertically by swinging the arms 45 about the axis of the shaft 46, which may be accomplished by hydraulic power devices 49, connected at one end with each arm 45 and at the opposite end with the end frame section 10. Each of the hydraulic power devices 49 is of a character well understood in the art comprising a cylinder having a piston mounted therein for movement under the influence of fluid which is forced into the cylinder at one side or the other of the piston. These hydraulic power devices may be controlled and operated by suitable means, such as a pump 50 and a four-way control valve 51 located within the cab 40, which are shown diagrammatically in Fig. 1. The raising and lowering of the reel 43 is accomplished hydraulically so as to actuate both of the hydraulic plungers 57 simultaneously. To raise the reel the valve handle 51a is positioned so as to withdraw the hydraulic fluid from reservoir 52 through conduit 53 and direct it into the lower end of cylinder 49. By the manipulation of handle 51a the fluid is directed into the opposite end of the cylinder to lower the reel. It is preferable to drive this unit through a belt 50b extending between the engine 36 and the pulley 50a positioned on the pump 50, which unit may be of standard conventional construction and requires no detailed description herein.

A reservoir 52 is provided from which hydraulic fluid is withdrawn by the pump 50 through a suction pipe 53 and discharged from the pump 50 outward through a conduit 54, to the four-way valve 51. Depending upon the position of the valve 51, the fluid will be discharged into the upper ends or the lower ends of the power cylinders 49, through conduits 55 and 56, respectively, to move the plungers 57 either downward or upward, respectively, to lower or raise the reel 43, as desired.

The operation of the machine will be evident from the foregoing description. The machine is operated over the surface of the ground with the flexible cutter 31 disposed relatively close to the surface of the ground and extending in bridging relation between the spaced end frames 6—10, as shown in Fig. 1. Thus the cutter will sever from the ground any upright trees, shrubs or underbrush, very close to the surface of the ground, as the cutter is operated in its endless path by means of the engine 36. The speed of this cutter is relatively high and it may be made up of small toothed cutting elements which will be effective to cut through any objects in its path. Additional paths may be cleared by the circular saws 32 at the opposite ends of the cutter path, sufficiently wide to clear the traction units 15.

These traction units 15 propel the machine along the surface of the ground, being operated by the engines 20 under the control of the transmissions 18. They may be regulated from the controls 41, so as to be moved in unison for straight-line operation of the machine, or varied in their speeds to cause a turning of the machine in one direction or another in a manner well understood in the operation of endless track devices.

The cutter 31 may be raised or lowered with respect to the ground by adjustment of the hydraulic power devices 21, which will cause the end frames 6—10 to swing about the pivots 5, as indicated in dotted lines in Figs. 3 and 4. This will cause the cutter to be raised or lowered to regulate the height of the cut, or to lift the cutter clear of the ground when the machine is to be moved from one location to another, so as to facilitate transportation thereof. It is preferred that the cut be made substantially at ground level which is made possible by this construction, because this leaves no upstanding stumps that would interfere with cultivation of the ground after the removal of the trees and brush, and the roots can be deadened more effectively without necessarily requiring the removal thereof.

Where the reel 43—44 is used, this may be raised or lowered by the hydraulic power devices 49, acting to swing the arms 45 in a vertical direction as indicated also in dotted lines in Fig. 3, so as to insure that the reel will clear the major portions of the tops of the trees and yet will cause these to be deflected under the cross bars 2, and to be directed to prone positions on the ground, permitting the machine to pass thereover.

In this way, the machine is capable of severing any upright growing trees or shrubs substantially at ground level and causing these to be turned downward out of the path of the machine, allowing freedom for passage of the machine thereover without interference by the cut objects. It is possible to clear a very substantial area of land with such a machine very quickly and readily and without interference by the cut plants with the operation of the machine.

While the invention has been illustrated and described in one embodiment, it is recognized that variations and changes may be made therein without departing from the invention, except as specified in the claims.

I claim:

1. In a machine of the character described, the combination of upright end frames laterally spaced from each other, a top member connecting the upper ends of the end frames together, an endless flexible cutter extending in bridging relation between the end frames adjacent the lower ends thereof and upwardly along the end frames and along the top member in an endless path, the space between said upright frames and intermediate said cutter and said top member forming an open throat, power means for driving said endless cutter, a traction means connected with each of the end frames for propelling the machine, and caster wheels on each of the opposite ends of said frame for supporting same and to provide follower wheels for said traction members.

2. In a machine of the character described, the combination of upright end frames laterally spaced from each other and each mounted on a sill, a top member connecting the upper ends of the end frames together, an endless flexible cutter extending in bridging relation between the end frames adjacent the lower ends thereof and upwardly along the end frames and along the top member in an endless path, the space between said upright frames and intermediate said cutter and said top member forming an open throat, power means for driving said endless cutter, a traction unit supporting each of said sills end frames and including means for propelling the machine, and hydraulic means for elevating said end frames which carry said endless flexible cutter.

3. In a machine of the character described, the combination of upright end frames laterally spaced from each other, a top member connecting the end frames together, an endless flexible cutter extending in bridging relation between the end frames adjacent the lower ends thereof and upwardly along the end frames and along the top member in an endless path, the space between said upright frames and intermediate said cutter and said top member forming an open throat, power means for driving said endless cutter, a traction unit supporting each of the end frames and including means for propelling the machine, and means pivotally supporting each end frame on the traction unit for raising and lowering the flexible cutter relative thereto.

4. In a machine of the character described, the combination of laterally spaced upright end frames forming an inverted U-member, a cutter extending in bridging relation between the end frames and mounted thereon for movement transversely thereto, power means for operating the cutter, and a traction unit supporting each of the end frames and having a pivotal connection therewith for swinging movement of each end frame relative thereto to raise or lower the cutter, each traction unit including power means independent of the power means for operating the cutter for propelling the machine.

5. In a machine of the character described, the combination of laterally spaced upright end frames, a cutter extending in bridging relation between the end frames and mounted thereon for movement transversely thereto, power means for operating the cutter, and a traction unit supporting each of the end frames and having a pivotal connection therewith for swinging movement of each end frame relative thereto to raise or lower the cutter, said traction unit including spaced sills, a power unit connected with the sills and having an endless traction propelling means connected therewith adjacent the front of the machine, and a supporting wheel connected with the sills adjacent the back of the machine.

6. In a machine of the character described, the combination of laterally spaced upright end frames, a cutter extending in bridging relation between the end frames and mounted thereon for movement transversely thereto, power means for operating the cutter, a traction unit supporting each of the end frames and having a pivotal connection therewith for swinging movement of each end frame relative thereto to raise or lower the cutter, each traction unit including power means for propelling the machine, each of the end frames including a plurality of sections detachably connecting together for disassembly and capable of selective use in superposed relation.

7. In a machine of the character described, the combination of laterally spaced upright end frames forming an unimpeded open throat a substantial distance above a traction power means, a cutter extending in bridging relation between the end frames and mounted thereon for movement transversely thereto, power means for operating the cutter, a traction unit supporting each of the end frames and having a pivotal connection therewith for swinging movement of each end frame relative thereto to raise or lower the cutter, each traction unit including power means for propelling the machine, and power devices connected with the end frames for causing swinging movement thereof on the pivotal connections.

8. In a machine of the character described, the combination of laterally spaced upright end frames, an open throat a substantial distance above a traction power means, a cutter extending in bridging relation between the end frames and mounted thereon for movement transversely thereto, power means for operating the cutter, a traction unit supporting each of the end frames and having a pivotal connection therewith for swinging movement of each end frame relative thereto to raise and lower the cutter, each traction unit including power means for propelling the machine, and fluid power devices connected with the end frames for causing swinging movement thereof on the pivotal connections.

9. In a machine of the character described, the combination of laterally spaced upright end frames, a top member connecting the end frames together, a cutter extending in bridging relation between the end frames and mounted thereon for movement transversly thereto, power means for operating the cutter, a traction unit supporting each of the end frames and having a pivotal connection therewith for swinging movement of each end frame relative thereto to raise or lower the cutter, each traction unit including power means for propelling the machine, a reel extending transversely between the end frames, arms carried by the end frames for swinging movement and supporting the reel thereon, means for operating the reel, and power devices connected with the arms for adjusting the position of the reel relative to the top member.

10. In a machine of the character described, the combination of upright end frames laterally spaced from each other, a top member connecting the end frames together, an endless flexible cutter extending in bridging relation between the end frames adjacent the lower ends thereof and upwardly along the end frames and along the top member in an endless path, the space between said upright frames and intermediate said cutter and said top member forming an open throat, power means for driving said endless cutter, traction means supporting said end frames, and a power driven circular saw mounted on each of the end frames forwardly of the traction means in cutting a path ahead of the traction means.

11. In a machine of the character described, the combination of upright end frames laterally spaced from each other, a top member connecting the end frames together, an endless flexible cutter extending in bridging relation between the end frames adjacent the lower ends thereof and upwardly along the end frames and along the top member in an endless path, power means for driving said endless cutter, traction means supporting said end frames, and a power driven circular saw mounted on each of the end frames forwardly of the traction means and extending laterally outward for cutting a path ahead of and laterally outward from the traction means.

12. In a machine of the character described, the combination of upright end frames laterally spaced from each other, a top member connecting the end frames together, an endless flexible cutter extending in bridging relation between the end frames adjacent the lower ends thereof and upwardly along the end frames and along the top member in an endless path, the space between said upright frames and intermediate said cutter and said top member forming an open throat, power means for driving said endless cutter, traction means supporting said end frames, a circular saw mounted on each of the end frames forwardly of the traction means in cutting a path ahead of the traction means, and means for driving said circular saw from the endless flexible cutter.

13. In a machine of the character described, the combination of upright end frames laterally spaced from each other and each mounted on a sill, a top member connecting the upper ends of the end frames together, an endless flexible cutter extending in bridging relation between the end frames adjacent the lower ends thereof and upwardly along the end frames and along the top member in an endless path, guiding means mounted on the lower ends of the end frames for guiding the flexible cutter, separate guide means for the endless cutter on each end of the top member, power means for driving said endless cutter, a block, a pair of parallel bars slidably mounting said block, said drive means including a pair of guide sheaves positioned within a loop in the upper reach of said flexible cutter, one of which sheaves is journaled on said block the axis of one of said sheaves being angularly disposed with respect to the axis of the other of said sheaves, an outwardly projecting member mounted on said top member, a resilient element connected to said outwardly projecting member and screw means for applying pressure to said resilient element to transmit tension to said block and said loop of said flexible cutter.

14. In a machine of the character described the combination of upright, sectional end frames laterally spaced from each other, a top member connecting the end frames together, an endless flexible cutter extending in bridging relation between the end frames adjacent the lower ends thereof and upwardly along the end frames and along the top member in an endless path, the space between said upright end frames and intermediate said cutter and said top member forming an open throat, said upright sectional end frames constructed to permit the removal of certain of said sections to vary the height of said top member above the lower reach of said cutter member, power means for driving said endless cutter, a traction unit supporting each of the end frames and including means for propelling the machine, and means pivotally supporting each end frame on the traction unit for raising and lowering the flexible cutter relative thereto.

15. In a mobile machine of the character described, the combination of a pair of laterally spaced upright end frames, a top member connecting the upper ends of said upright end frames, a substantially horizontal roller member journaled near the lower end of each of said upright end frames on the forward side thereof, a substantially vertical roller member journaled near the lower end of each of said upright frames and having a circumferential face thereof substantially tangent with the circumferential face of the respective horizontal rollers so as to define a path for an endless cutter, an endless flexible cutter extending in bridging relation between and over said horizontal roller members and extending upwardly along said upright end frames and along said top member in an endless path, power means for driving said endless flexible cutter and said mobile machine.

16. In a mobile machine of the character described, the combination of a pair of laterally spaced upright end frames, a top member connecting the upper ends of said upright end frames, a substantially horizontal, resiliently faced, roller member journaled near the lower end of said upright end frames on the forward side thereof, a substantially vertical, resiliently faced roller member journaled near the lower end of each of said upright frames and having a circumferential face thereof substantially tangent with the circumferential face of the respective horizontal rollers, so as to define a path for an endless cutter, an endless flexible cutter extending in bridging relation between and over said horizontal roller members and extending upwardly along said upright end frames and along said top member in an endless path, separate roller guide means for the endless flexible cutter, which separate roller guide means are journaled on the respective ends of said top member, and means for driving said endless flexible cutter and said mobile machine.

17. In a mobile machine of the character described, the combination of a pair of laterally spaced upright end frames, a top member connecting the upper ends of said upright end frames, a substantially horizontal sheave journaled near the lower end of each of said upright end frames on the forward side thereof, a second sheave mounted one on each of said upright end frames adjacent the first mentioned sheave, in substantially vertical position so that the grooved peripheries of said respective adjacent sheaves are substantially in tangential alignment, an endless flexible cutter extending over said vertical sheaves and onto and in bridging relation between said horizontal sheaves, said cutter extending upward along said upright end frames and along said top member in an endless path, power means for driving said endless flexible cutter and said mobile machine.

18. In a machine of the character described, the combination of upright end frames spaced from each other, a top member connecting the end frames together, an endless flexible cutter extending in bridging relation between the end frames adjacent the lower ends thereof and upwardly along the end frames and along the top member in an endless path, a substantially horizontal sheave guiding means mounted on the lower end of each of said end frames for guiding said flexible cutter, vertically disposed sheaves, one mounted near the lower end of each of said frame members to guide said cutter onto said horizontal sheaves, separate guide means for the endless flexible cutter adjacent opposite ends of the top member, and power means for driving said endless cutter including a driving element and a guiding element having a section of the upper reach of said flexible cutter extending in a loop around said driving element and said guiding element, one of said elements being arranged on an axis tilted relative to the axis of the other element.

FREDRICK A. LOWER.

REFERENCES CITED

The following references are of record in the file of this patent:

UNITED STATES PATENTS

| Number | Name | Date |
|---|---|---|
| 791,667 | Abrey | June 6, 1905 |
| 1,054,693 | Klingele | Mar. 4, 1913 |
| 1,894,516 | Karstedt | Jan. 17, 1933 |
| 1,955,063 | Greitzer | Apr. 17, 1934 |

FOREIGN PATENTS

| Number | Country | Date |
|---|---|---|
| 7,890 | Great Britain | of 1886 |
| 436,171 | France | Mar. 12, 1912 |
| 437,117 | France | Apr. 13, 1912 |
| 246,726 | Italy | Apr. 3, 1926 |